UNITED STATES PATENT OFFICE.

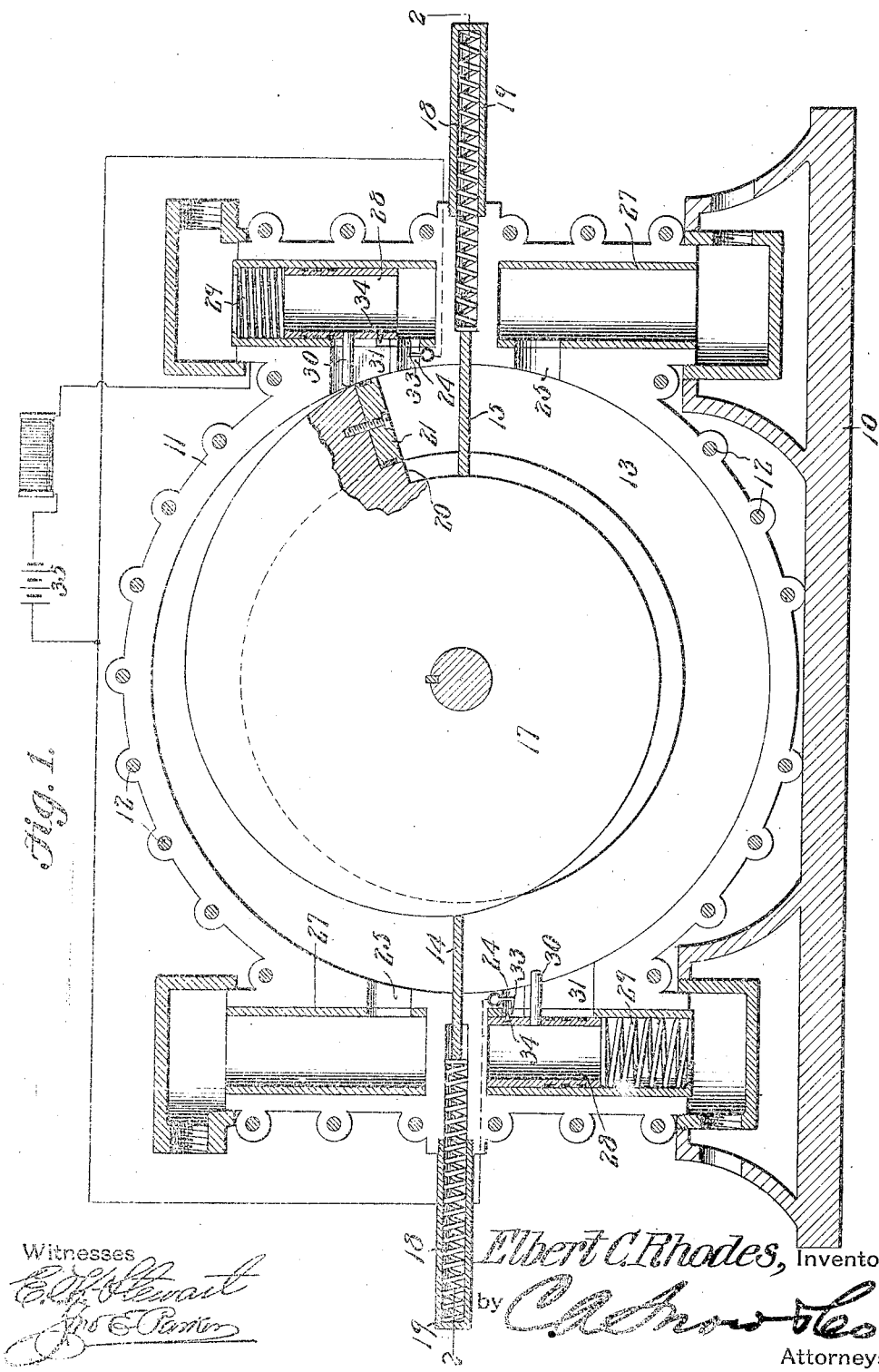

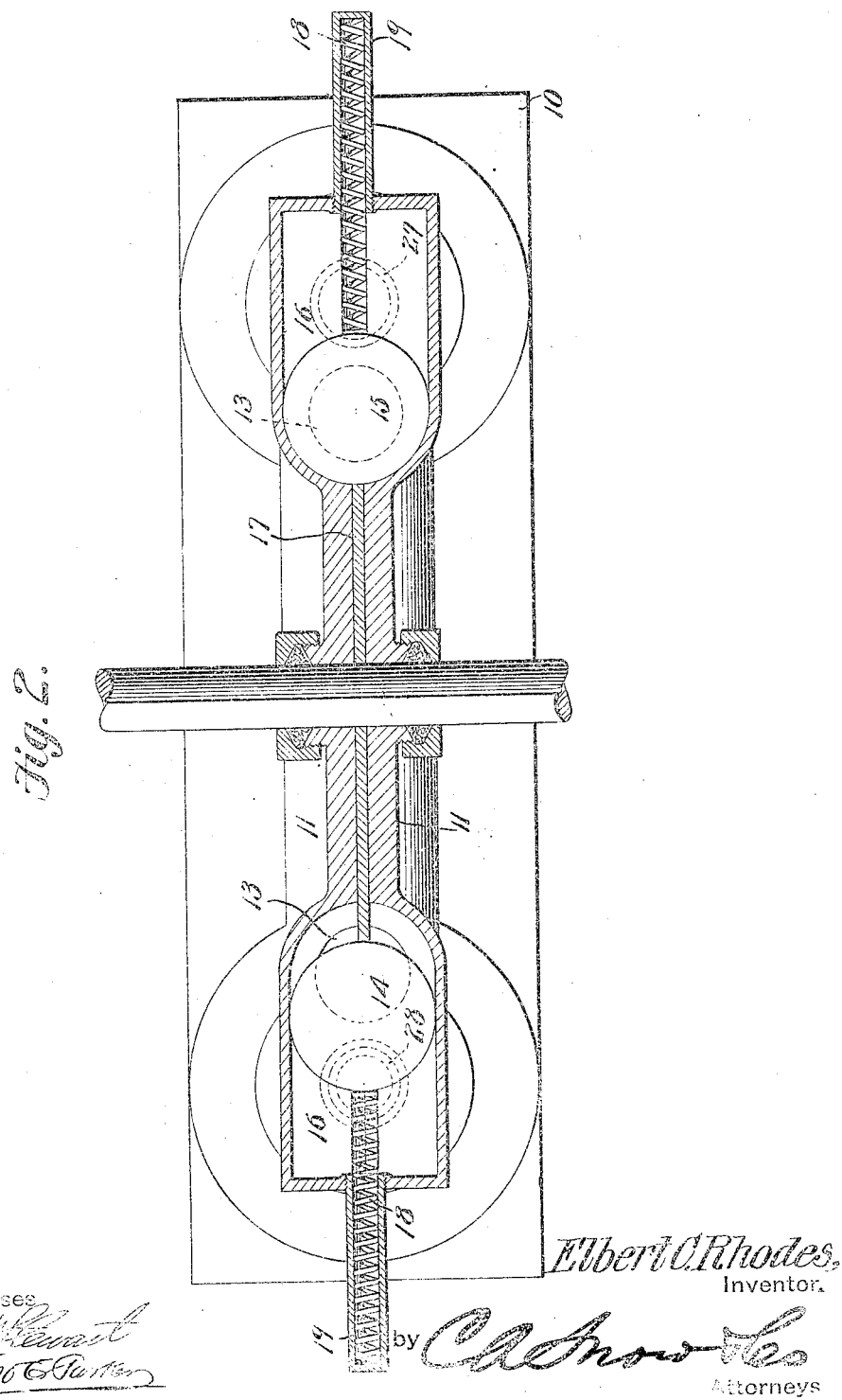

ELBERT CHARLES RHODES, OF DETROIT, MICHIGAN.

ROTARY ENGINE.

No. 873,607.  Specification of Letters Patent.  Patented Dec. 10, 1907.

Application filed October 11, 1905. Serial No. 282,309.

*To all whom it may concern:*

Be it known that I, ELBERT CHARLES RHODES, a citizen of the United States, residing at Detroit, in the county of Wayne and State of Michigan, have invented a new and useful Rotary Engine, of which the following is a specification.

This invention relates to rotary engines, and has for its principal object to provide a novel form of engine in which an explosive mixture may be used for power, the engine being, also, of such construction as to permit the employment of steam, air or other fluid as the controlling medium.
A further object of the invention is to provide a rotary engine in which the inlet valves are arranged to move on lines substantially tangential to the periphery of the piston, and are provided with pins or similar members that engage with the cam surface of the piston drum for the purpose of moving them to open position.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.
In the accompanying drawings:—Figure 1 is a vertical section of a rotary engine constructed in accordance with the invention. Fig. 2 is a plan view of the same on the line 2—2 of Fig. 1.
Similar numerals of reference are employed to indicate corresponding parts throughout the several figures of the drawings.

The engine is provided with a base 10, and the cylinder constitutes two approximately cylindrical heads 11 that are provided with bolting flanges and are rigidly held together by bolts 12. The expansion space 13 is annular and is divided into two separate chambers by slidable abutments 14 and 15 that are arranged in guiding recesses 16. The abutments are in the form of free disks of a diameter considerably greater than the cross section of the expansion space 13, and the guiding recesses 16 extend across said expansion space, so that the abutment will be supported by the walls of the recess at all points. The abutments are held in engagement with the periphery of the piston drum 17 by means of helical compression springs 18 arranged in a suitable guiding casing 19 at the sides of the cylinder.

The piston disk 17 is in the form of a comparatively thin plate, and its periphery is in the form of a spiral cam, at the abrupt shoulder 20 of which is secured a piston wing 21 that is circular in form, and is provided with a suitable packing ring, the piston fitting snugly in the annular expansion space or chamber 13. The shoulder 20 is arranged in a line leading from the center of rotation of the disk and extends inward from the inner face of the piston wing to a point beyond the annular expansion space of the cylinder. As the piston disk revolves, the cam-like surface of said disk will force the abutment outward from the expansion space, and after the piston passes each abutment, the latter will be forced inward by its spring, and a cylinder will be formed between the abutment and the receding piston, this space being then filled with the actuating fluid.

The engine is provided with two inlet ports 24 and two exhaust ports 25, and the valve chambers from which these ports lead are in the form of tubes 27 which are placed in position in recesses formed in the sectional casings of the cylinder, so that when the latter is bolted together, the tubes will be held in place and leakage prevented.

The tubes which form the inlet chambers are provided with slidable piston valves 28, each valve being in the form of a hollow cylinder that normally is held in closed position by a helical compression spring 29, and when the valve is held to its seat, as shown to the left of Fig. 1, the inlet port 24 will be closed. Projecting from each of the valves is a pin 30 which extends through a recess 31 formed in the wall of the cylinder and projects into the path of movement of the periphery of the piston disk, so that as the latter moves around, it will engage the pin and force the latter to a position to open the valve, as shown, for instance, to the right of Fig. 1, this movement occurring after the piston has passed the abutment, and the valve is held open for a sufficient length of time to permit the entrance of steam, air or other actuating fluid. After the piston passes beyond the pin 30, the valve is restored to its closed position by the spring 29, and thereafter th— fluid will act expansively within the cylinder and will drive the piston ahead.

As the construction is especially adapted for the employment of an explosive mixture as the actuating medium, an igniting device is placed at each of the inlet ports 24. This igniting device comprises an electrode 33 that is insulated from the casing, and a second electrode 34 that is carried by the valve and is adapted to wipe past the electrode 33. The two electrodes are connected in circuit with a battery 35, or some other source of electrical energy, and said electrodes are so disposed that during the closing movement of the valve, after the admission of the explosive compound, the electrode 34 will wipe past the electrode 33, creating a spark that will ignite the explosive compound. This, however, cannot occur until the valve itself is practically closed, the movement of the valve under the action of spring 29 being very rapid, and the sparking being practically instantaneous, so that there can be no back fire through the valve chamber.

With a device constructed in accordance with this invention it is possible to obtain very high speed at comparatively small cost and the engine operates without perceptible vibration.

Having thus described the invention, what is claimed is:—

1. The combination in a rotary engine, of a cylinder having an annular working space of approximately circular form in cross section, a piston disk approximately in the form of a spiral cam and provided with a radial face, a piston wing circular in form and secured to the radial face of the disk, the disk having a radially arranged shoulder in alinement with the pressure face of the piston wing, and extending inward beyond the inner wall of the working space of the cylinder, a pair of abutments engaging with the periphery of a piston disk and movable inward to a point beyond the extreme inner edge of such working space, and piston controlled inlet valves located beyond the abutments and arranged to be operated by the periphery of the piston disk after the abutments have moved across and closed the working space of the cylinder.

2. The combination in a rotary engine, of a cylinder formed of a pair of castings arranged to form an annular working space and provided with recesses at points outside said working space, a piston disk, a wing carried thereby and arranged to travel in the working space of the cylinder, and inlet and discharge passages communicating with the working space of the cylinder and provided with solid tubular linings that are confined within said recesses to prevent leakage of the fluid between the members of the cylinder.

3. The combination in a rotary engine, of a cylinder, a movable piston disk arranged therein and having a cam shaped periphery, a piston inlet valve arranged to move in a line substantially tangential to the piston, and a pin projecting from said valve and disposed in the path of movement of the piston.

4. The combination in a rotary engine, of a cylinder, a piston disk arranged therein, a wing on the disk, an abutment, an inlet port adjacent to the abutment, a hollow cylindrical valve for controlling the flow of fluid through said port, and arranged to move in a line substantially tangential to the piston, and a pin projecting from the valve through a recess in the wall of the cylinder and arranged to be engaged by the periphery of the piston disk.

In testimony that I claim the foregoing as my own, I have hereto affixed my signature in the presence of two witnesses.

ELBERT CHARLES RHODES.

Witnesses:
W. J. JUDGE,
J. E. RUSH.